(12) United States Patent
Jegou

(10) Patent No.: US 10,948,623 B2
(45) Date of Patent: Mar. 16, 2021

(54) INSPECTION SYSTEM WITH A MATRIX AND METHOD

(71) Applicant: SMITHS HEIMANN SAS, Vitry sur Seine (FR)

(72) Inventor: Guillaume Jegou, Vitry sur Seine (FR)

(73) Assignee: SMITHS HEIMANN SAS, Paris (FR)

(*) Notice: Subject to any disclaimer, the term of this patent is extended or adjusted under 35 U.S.C. 154(b) by 18 days.

(21) Appl. No.: 16/321,204

(22) PCT Filed: Jul. 27, 2017

(86) PCT No.: PCT/GB2017/052199
§ 371 (c)(1),
(2) Date: Jan. 28, 2019

(87) PCT Pub. No.: WO2018/020258
PCT Pub. Date: Feb. 1, 2018

(65) Prior Publication Data
US 2019/0170895 A1     Jun. 6, 2019

(30) Foreign Application Priority Data

Jul. 28, 2016 (GB) .................................. 1613070

(51) Int. Cl.
*G01V 5/00* (2006.01)
*G01N 23/04* (2018.01)

(52) U.S. Cl.
CPC .......... *G01V 5/0066* (2013.01); *G01N 23/04* (2013.01); *G01V 5/0041* (2013.01)

(58) Field of Classification Search
CPC ... G01V 5/0016; G01V 5/0041; G01V 5/0066
See application file for complete search history.

(56) References Cited

U.S. PATENT DOCUMENTS 4,963,746 A * 10/1990 Morgan ................... A61B 6/06
378/156
5,570,403 A * 10/1996 Yamazaki ............. A61B 6/032
378/19
(Continued)

FOREIGN PATENT DOCUMENTS

EP      2400318 A1    12/2011
GB      2513069 A     10/2014
(Continued)

OTHER PUBLICATIONS

Search Report for Application No. GB1613070.0, dated Jan. 10, 2017.
(Continued)

*Primary Examiner* — Chih-Cheng Kao
(74) *Attorney, Agent, or Firm* — Kevin E. West; Advent, LLP

(57) ABSTRACT

In one aspect, it is disclosed a system for inspection of a load, comprising: a detection device configured to detect, after transmission through the load, successive radiation pulses emitted at a predetermined frequency by a source, the load being in movement in an inspection direction, at an inspection speed with respect to the system, the detection device comprising a matrix of a plurality of arrays of detectors, wherein the matrix has a width associated with the inspection direction, the width of the matrix being based on the inspection speed of the load and the predetermined frequency of the successive radiation pulses.

16 Claims, 5 Drawing Sheets

(56) References Cited

U.S. PATENT DOCUMENTS

2005/0276376 A1 12/2005 Eilbert
2013/0230139 A1* 9/2013 Morton ................ G01V 5/0066
378/57

FOREIGN PATENT DOCUMENTS

WO 2013/082005 A1 6/2013
WO 2013119423 A1 8/2013

OTHER PUBLICATIONS

International Search Report and Written Opinion for PCT/GB2017/052199, dated Dec. 22, 2017.

* cited by examiner

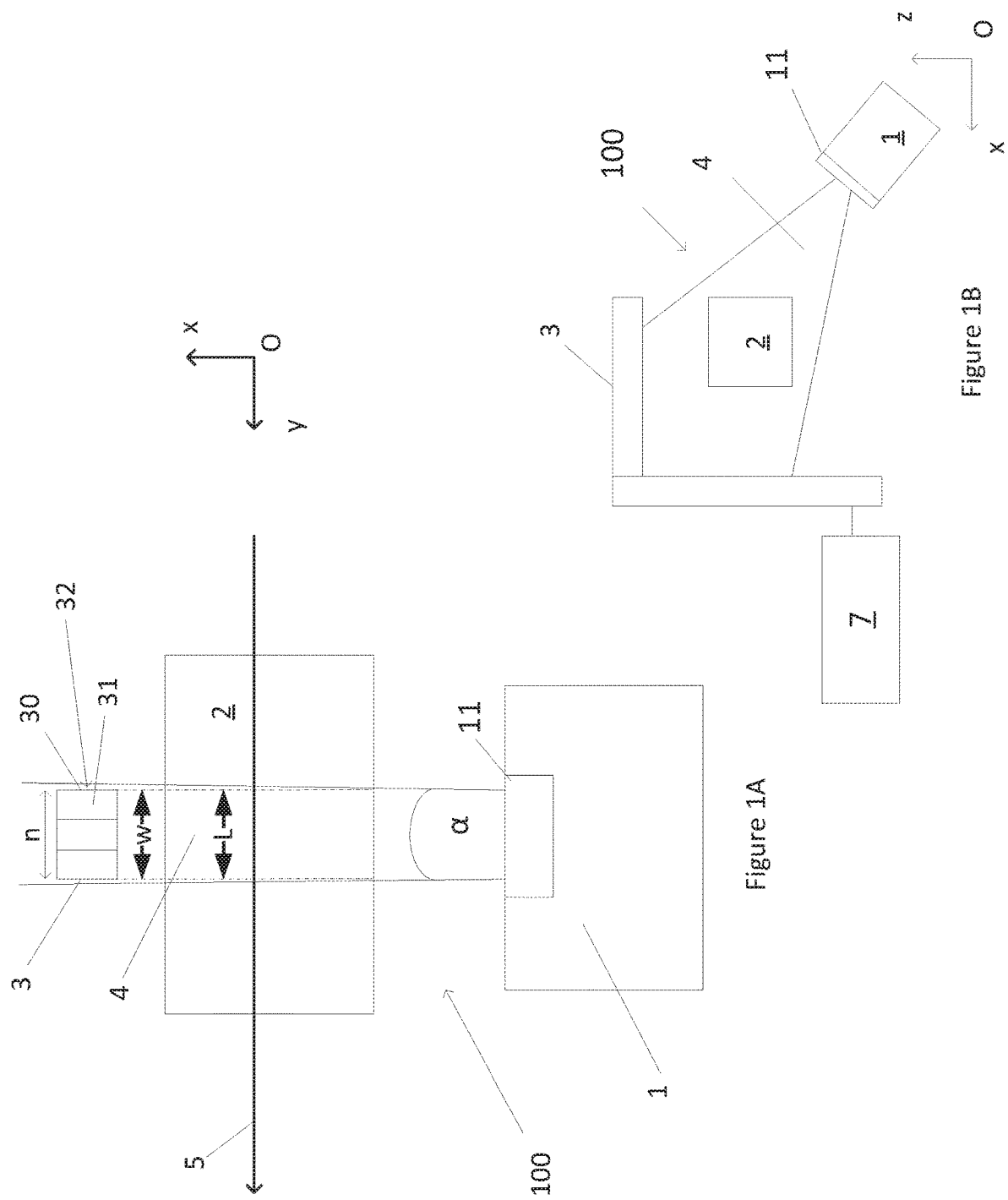

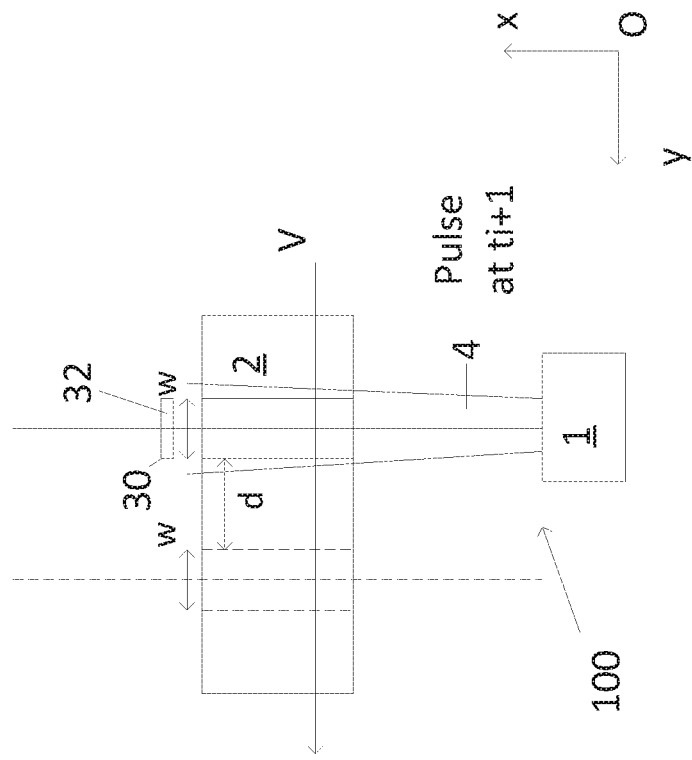
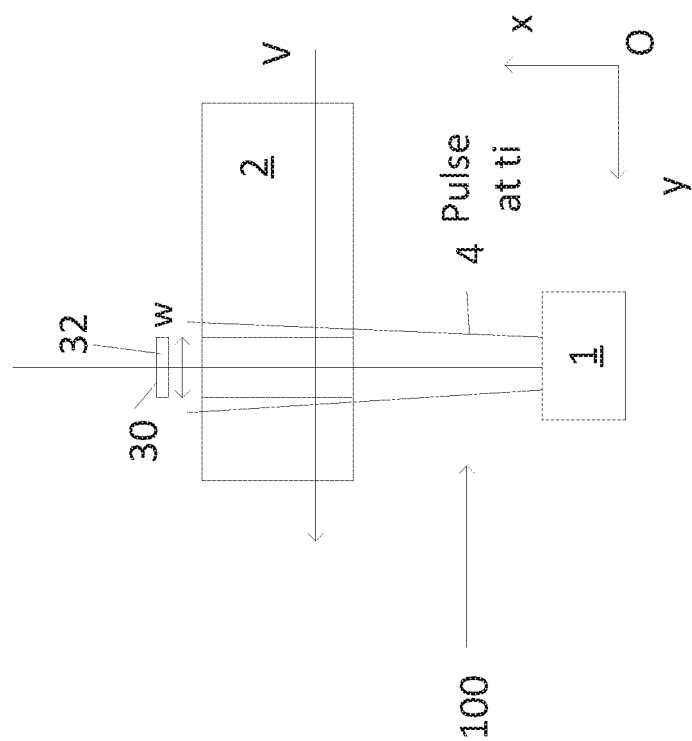

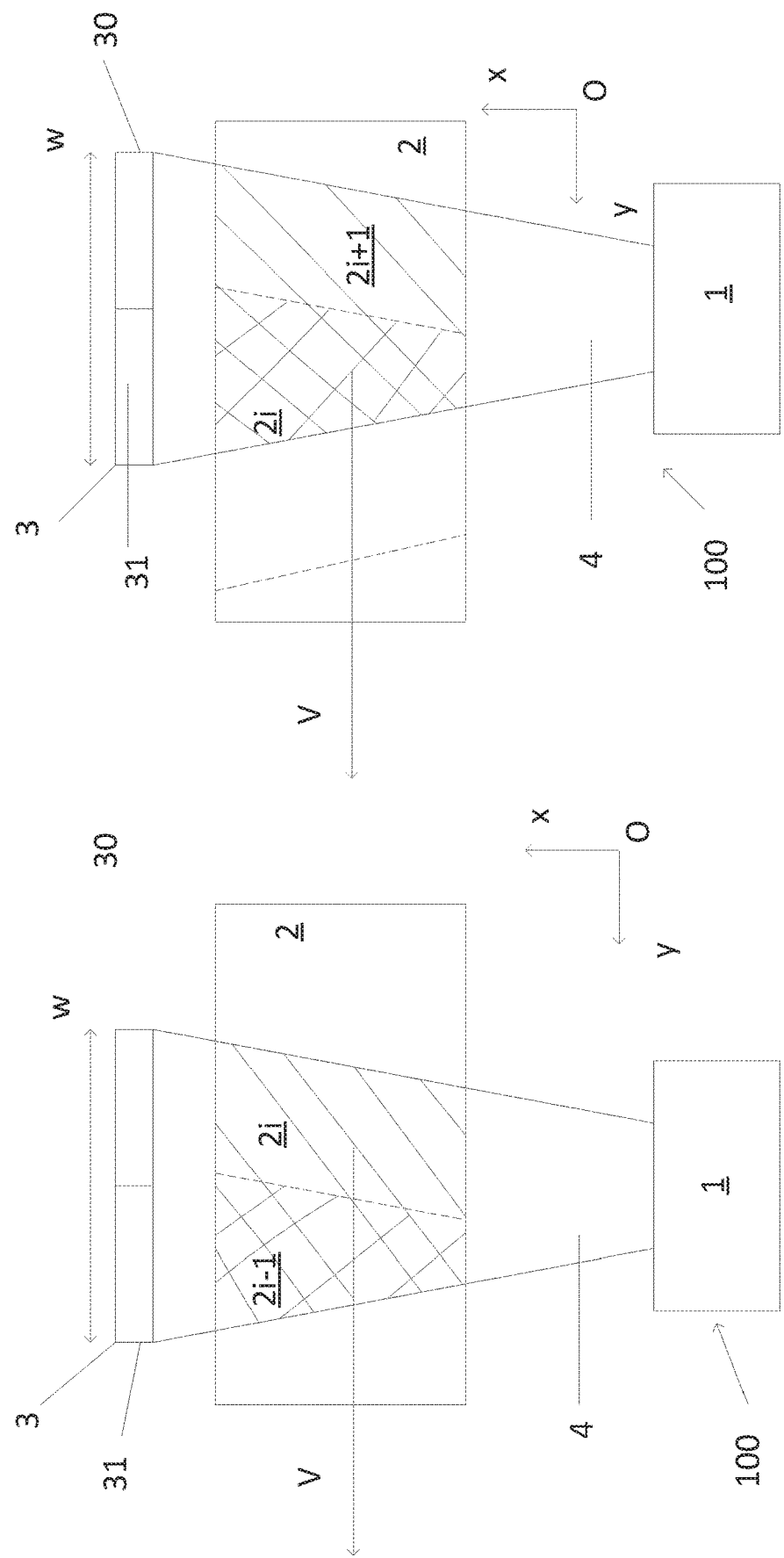

INSPECTION SYSTEM WITH A MATRIX AND METHOD

FIELD OF INVENTION

The present disclosure relates, but is not limited, to systems and methods for inspecting a load with a matrix of detectors.

BACKGROUND

Inspection systems use inspection radiation transmitted through a load (such as a vehicle) for inspecting cargo of the load, for example to detect hidden objects (such as weapons or dangerous material).

In some examples, the load is moving with respect to the inspection system. A final image of the load and/or cargo is constructed by grouping thin images of the load generated during the movement of the load with respect to the inspection system.

When the speed of the load with respect to the inspection system increases, a distance between two successive thin images increases, and parts of the load may not be viewed in the final image. This may result in hidden objects not being detected.

Aspects of the present invention address some of the above issues.

SUMMARY OF INVENTION

Aspects and embodiments of the invention are set out in the appended claims. These and other aspects and embodiments of the invention are also described herein.

PRESENTATION OF THE FIGURES

Embodiments of the disclosure will now be described, by way of example only, with reference to the accompanying drawings, in which:

FIG. 1A shows an example inspection system, in a top view;

FIG. 1B shows an example inspection system, in a side view;

FIG. 2A shows an example inspection system, in a top view, for a first pulse;

FIG. 2B shows an example inspection system, in a top view, for a second pulse;

FIG. 3A shows an example inspection system, in a top view, for a first pulse;

FIG. 3B shows an example inspection system, in a top view, for a second pulse;

In the drawings, like elements are referred to by the same numerical references.

DESCRIPTION OF EXAMPLE EMBODIMENTS

Overview

Figure 5:
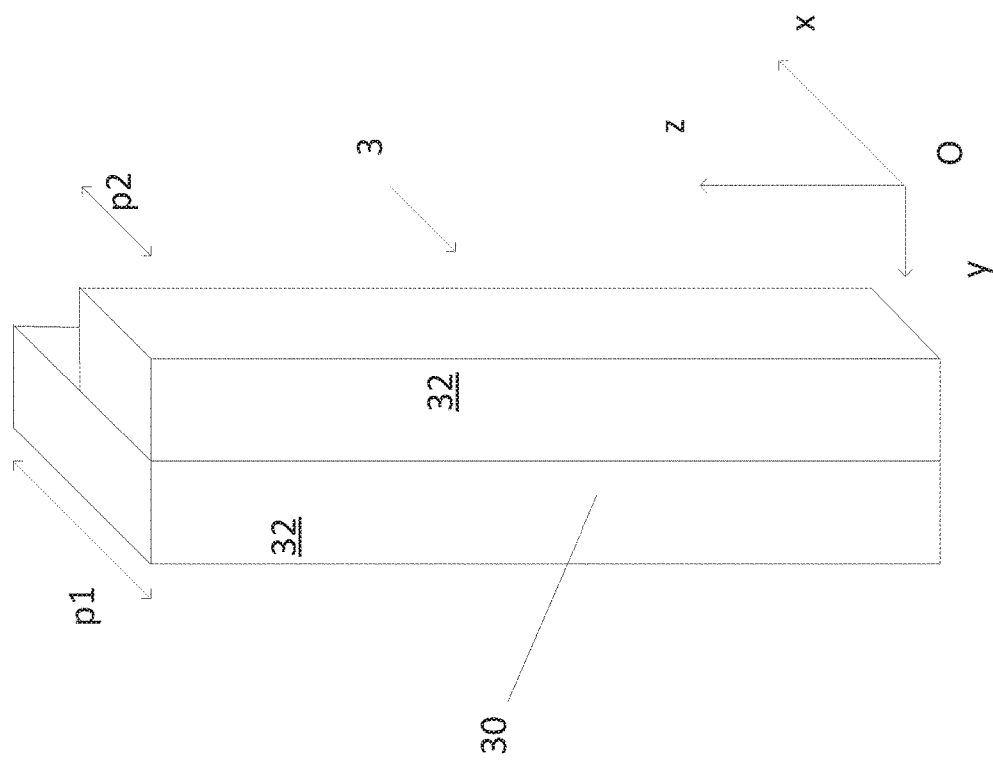
FIG. 5 shows an example detection device, in a perspective view, having arrays of different depths.

Embodiments of the present disclosure relate to a system for inspection of a load. The system comprises a matrix of detectors. The matrix of detectors comprises a plurality of arrays of detectors, e.g. linear arrays of detectors. During an inspection, the load is in movement with respect to the system. The movement of the load may be carried out along an inspection direction, at an inspection speed. The number of arrays of detectors in the matrix is based on the inspection speed of the load and a predetermined frequency of successive radiation pulses that the matrix is configured to detect. The successive pulses may be emitted by a source and may be transmitted through the load. The number of arrays of detectors in the matrix may further be based on a width of each array, in the inspection direction. In some examples, a resolution of detection may be enhanced as the number of arrays of detectors is increased.

In examples, e.g. where the inspection speed is relatively high (such as greater than 5 km/h), a predetermined extent of the load (such as an extent comprised between e.g. 50% and 100% of the load) may be irradiated by the successive radiation pulses and detected by the matrix of detectors. A success rate e.g, of detection of hidden objects, at relatively high inspection speed, may be enhanced.

Alternatively or additionally, e.g. in examples where the inspection speed is relatively low, successive parts irradiated by the successive radiation pulses detected by the matrix of detectors may overlap, at least partly. A quantity of data associated with each irradiated part of the load for which overlapping occurs may be increased, and the quality of the final image may also be enhanced. This may be advantageous in examples where the successive radiation pulses are emitted at a relatively low dose. Alternatively or additionally, e.g. in examples where the successive radiation pulses are emitted at a relatively low dose, additional arrays of detectors associated with the arrays of the matrix may be configured to detect radiation transmitted through the matrix. A quantity of data associated with each irradiated part of the load may be increased, as it is detected by the arrays of the matrix and the additional arrays, and the quality of the final image may also be enhanced.

Alternatively or additionally, some arrays may have a depth, in a direction of the radiation pulses, different from that of one or more other arrays in the matrix. A difference in data associated with each array having a different depth may enable determining a nature of a material irradiated by the successive radiation pulses, and identification of materials of the load may be enhanced.

DETAILED DESCRIPTION OF EXAMPLE EMBODIMENTS

As illustrated in the Figures, the system may be described with reference to an orthonormal reference OXYZ, axis OZ being the ascending vertical, a plane YOZ being vertical, a plane XOY being horizontal, and a plane XOZ being vertical.

In FIGS. 1A and 1B, a system 100 for inspection of a load 2 comprises a detection device 3.

The load 2 may be any type of object and/or any type of container, such as a holder, a vehicle or a vessel, or a box, etc. The load 2 may thus be, as non-limiting examples, a trailer and/or a palette (for example a palette of European standard, of US standard or of any other standard) and/or a train wagon and/or a tank and/or a boot of a vehicle such as a truck, a van and/or a car and/or a train, and/or the load 2 may be a "shipping container"(such as a tank or an ISO container or a non-ISO container or a Unit Load Device (ULD) container). It is thus appreciated that the load 2 may be any type of container, and thus may be a suitcase in some examples.

The system 100 is configured to cause inspection of a cargo (not shown in the Figures) of the load through a material (usually steel) of walls of the load 2, e.g. for detection and/or identification of the cargo.

In some examples, the system 100 may be configured to cause inspection of the load 2, in totality (i.e. the whole load 2 is inspected) or partially (i.e. only a chosen part of the load 2 is inspected, e.g., typically, when inspecting a vehicle, a cabin of the vehicle may not be inspected, whereas a rear part of the vehicle is inspected).

The detection device 3 is configured to detect successive radiation pulses 4 after transmission through the load 2.

The pulses 4 are emitted by a source 1, at a predetermined frequency F. There is a limited range of different predetermined frequencies F, depending on different given types of sources 1. Each source 1 is configured to emit the successive radiation pulses 4 at a predetermined frequency F, and the pulses 4 are thus emitted at a predetermined frequency F by a given source 1. In some examples, the sources 1 may be configured to emit the successive pulses 4 at a frequency F, such that:

$$50\ Hz \leq F \leq 1000\ Hz.$$

In some examples, the predetermined frequency F is as described above and may be comprised between 100 Hz and 400 Hz, such as equal to 200 Hz. Other frequencies F are envisaged.

During an inspection of the load 2, the load 2 is in movement with respect to the system 100. In the example of FIGS. 1A and 1B, the load 2 is in movement in an inspection direction 5 (e.g. axis OY in the Figures), at an inspection speed V.

In some examples, the system 100 may be configured to operate in a pass-through mode. In the pass-through mode, the system 100 is static with respect to the ground and the load 2 is movable with respect to the ground. Examples of pass-through modes of operation include the load being a vehicle such as a truck. In some examples, a driver of the vehicle may drive the truck through the system, e.g. including a gantry. In some examples (e.g. where the radiation is relatively high), the apparatus may comprise a conveyor configured to carry the vehicle (such as the truck) through the system, e.g. at low speed (e.g. lower than 5 km/h). The above mode of operation is sometimes referred to as a "conveyor" mode of operation. In some examples, the system 100 may be configured to operate in a scan mode. In the scan mode, the system 100 is movable with respect to the ground and the load 2 is static with respect to the ground.

In some examples, the system 100 may be mobile and may be transported from a location to another location (the system 100 may comprise an automotive vehicle). Alternatively or additionally, the inspection system 100 may be static with respect to the ground and cannot be displaced.

In some examples, the speed V may be such that:

$$1\ km/h \leq V \leq 100\ km/h.$$

In some examples, the speed V may be comprised between 3 km/h (approximately 0.83 m/s) and 60 km/h (approximately 16.67 m/s), such as equal to 10 km/h (approximately 2.78 m/s) or 30 km/h (approximately 8.33 m/s). Other speeds are envisaged. In some examples, the speed V may be considered as relatively high when V≥5 km/h and considered as relatively low when V≤5 km/h, for example equal to 1 km/h.

The inspection speed V may be predetermined (in some example the inspection speed V may be a prerequisite for the inspection of the load) and/or measured, e.g. by a speed sensor which can be a part of the system 100 or part of another apparatus, e.g. external to the system 100.

In the example of FIGS. 1A and 1B, the detection device 3 comprises a matrix 30 of detectors 31. The matrix 30 comprises a plurality of arrays 32 of detectors 31 in the inspection direction 5, where n is the number of arrays 32 in the matrix 30 (n≥2). In some examples, n is such that $$2 \leq n \leq 75.$$

Other values of n are envisaged.

The matrix 30 has a width w associated with the inspection direction 5 of the load 2. In some examples, each one of the arrays 32 comprises a linear array of detectors, the linear arrays extending in a direction perpendicular to the inspection direction 5. In some examples, the arrays 32 may comprise, amongst other conventional electrical elements, radiation detection lines, such as X-ray detection lines. Each of the X-ray detection detectors may be configured to measure an amplitude of a signal in a scintillator. It should be understood that in some examples the matrix 30 may comprise a plurality of distinct arrays 32, but in some examples the arrays 32 of the matrix 30 may not be separated from each other, such that the matrix 30 may constitute a single physical unit.

In the example of FIGS. 1A and 1B, each pulse 4 has an angular width α in the inspection direction 5, and irradiates a part of the load 2. Each pulse 4 is detected by the detection device 3 after transmission through the load 2 to generate a thin image of the load 2 (e.g. the thin images are defined by the width w).

In some non-limiting examples, the matrix 30 is located within the angular width α of each radiation pulse 4, and ensures that the pulse 4 is detected by the matrix 30. The angular width α and the width w of the matrix 30 are chosen such that a part of the load 2 which is irradiated by the pulse 4 but which is not detected by the matrix 30 is relatively small. In some examples, and as described below, the system may be relatively resilient to mechanical vibrations within the system. In some examples, if the matrix 30 is mounted on a structure which can move and/or vibrate (for example when the system 100 operates in a scan mode), the pulse 4 may be detected by the matrix 30, even if the matrix 30 vibrates slightly within the angular width α. In examples where the vibrations are larger and the matrix 30 exits from the angular width of the pulse 4, in some examples, data associated with the arrays 32 which are outside the angular width of the pulse 4 are not taken into account when generating the thin images. As illustrated by FIG. 1A, the maximum width L of the thin image generated by each pulse 4 is defined by the width w of the matrix 30.

As illustrated in FIGS. 2A and 2B, for a predetermined frequency F of the source 1 and a given speed V of the load 2, the distance d between two parts of the load irradiated by two successive pulses 4 and detected by the matrix 30 may be determined by:

$$d = V \times \frac{1}{F} - w. \qquad \text{Equation (E1)}$$

It should be understood that d may be associated with a threshold T. In some examples T is associated with a dimension of the load, e.g. which may not be inspected (e.g. a dimension under which objects hidden in the load, such as a cargo of the load, may not be detected) because not irradiated by the pulses. In some examples, T may be predetermined and defined such that:

$T \leq d.$

Other values of T are envisaged.

The threshold T is predetermined for a given system 100, e.g. based on an application envisaged for the given system 100 and/or based on a minimum dimension of parts of the load to inspect (e.g. a minimum dimension of hidden objects to detect). It should be understood that in order to detect smaller objects, for a given frequency F and a given speed V, T needs to be reduced.

For example, with a frequency F of 100 Hz, a width w of 20 mm, and a speed V of 60 km/h:

$$d = 16.67 \times \frac{1}{100} - 0.02 \approx 0.147 \text{ m}.$$

In such an example, hidden objects having a dimension lower than e.g. T=14 cm may not be detected.

For example, with a frequency F of 400 Hz, a width of 10 mm, and a speed V of 60 km/h:

$$d = 16.67 \times \frac{1}{400} - 0.01 \approx 0.032 \text{ m}.$$

In such an example, hidden objects having a dimension lower than T=3 cm may not be detected.

In examples of the system 100, the matrix 30 may have a width w based on the inspection speed V of the load, the predetermined frequency F of the successive radiation pulses and the predetermined threshold T. In some examples, based on Equation (E1), the width w of the matrix 30 may thus be determined by:

$$w = V \times \frac{1}{F} - T. \qquad \text{Equation (E2)}$$

In some examples, the width w of the matrix 30 may be such that:

$0.5 \text{ mm} \leq w \leq 150 \text{ mm}.$

The width w of the matrix 30 may thus be comprised between 1 mm and 60 mm, and for example be equal to 15 mm, 20 mm or 50 mm. Other values of w are envisaged.

In some examples, the predetermined threshold T enables a predetermined extent of the load to be irradiated by the successive pulses of radiation, as explained below. In some examples:

T≠0, and not all of the load 2 is irradiated by the successive pulses 4 (which may be acceptable for some applications of the system 100, e.g. where hidden objects are likely to be relatively large). In some examples, a predetermined extent of 50% or more of the load is irradiated; or T=0, and the whole of the load 2 is irradiated by the successive pulses 4 (e.g. no part of the load 2 does not appear in the final image of the load 2, even at a relatively high speed V for the load and with a relatively low given frequency F for the source 1).

In some examples and illustrated in FIGS. 1A and 1B, the source 1 may comprise a collimator 11 configured to collimate each of the successive radiation pulses 4 to the angular width a such that the matrix 30 is within the angular width a of each radiation pulse 4. In some examples, the collimator 11 is also configured to take into account a radiation footprint of the system 100, and to limit the width a of the pulses 4 so that the pulses encompass the matrix 30 with a security coefficient but are not too wide, as the radiation footprint of the system 100 usually increases as the angular width a increases.

In some examples, each array 32 in the matrix 30 may be referred to as an array 32$i$, and may have a width e referred to as ei in the inspection direction 5 of the load, where i is an integer such as:

$1 \leq i \leq n,$ where n is the number of arrays 32 in the matrix 30, with $n \geq 2$.

In some examples, the number n of arrays 32 of detectors 31 is further based on the width e of each array 32.

In some examples, each one of the arrays 32 in the matrix 30 has the same width e, such that:

$\forall i \neq j : ei = ej = e$, for i and j comprised between 1 and n.

The width w of the matrix is thus determined by:

$w = n \times e.$

In the context of the present disclosure, e may take into account the physical dimension of the detectors, and in some examples the arrays have no gap between each other. It should be understood that in some examples w may be augmented by gaps between the detectors.

In some examples, e may be such that:

$0.2 \text{ mm} \leq e \leq 50 \text{ mm}.$

In some examples, the matrix 30 comprises one or more arrays 32$i$ having a width ei different from that of one or more other arrays in the matrix 30. The width w of the matrix is thus determined by the sum of the widths of the n arrays 32 in the matrix 30, such that:

$$w = \sum_{i=1}^{n} ei.$$

In examples where the speed V may be greater than e.g. 5 km/h, the number n of arrays may be equal to 2, 3 or 4, or more. For example, for relatively high speed, the matrix 30 may comprise 4 arrays 32 of detectors, each array having a width of 5 mm. Examples for relatively low speed include a matrix 30 having 3 arrays 32 of detectors, each array having a width of 5 mm). The matrix 30 may enable quality of the final image of the load 2 to be improved (e.g. compared to a final image obtained with a detector device having a single array of detectors with the same width as the matrix), as explained below. Compared to a device having a single detector with the same width as the matrix, with the matrix 30 of the disclosure:

a predetermined extent of the load may be irradiated and detected (in some examples, there are no missing objects in the final image if T=0);

the quality of the final image with the matrix 30 may be enhanced because of a greater resolution due to the plurality of arrays, whereas smaller details may be absent or distorted on the example with a single array of detectors;

a curvature of the objects is respected and aliasing effect is reduced; and a same quantity of radiation is detected, and thus penetration does not change.

In examples where the inspection speed V is relatively high, the detector device 3 may enable the predetermined extent (such as 100%) of the load 2 to be irradiated by the successive radiation pulses 4 and detected by the matrix 30 of detectors. A success rate of detection of hidden objects at relatively high inspection speed may be enhanced.

Alternatively or additionally, in some examples, as illustrated in FIGS. 3A and 3B, the width w of the matrix 30 of detectors 31 is such that the detection device 3 is configured to detect a given (or current) radiation pulse 4 irradiating at least a given (or current) part 2$i$ of the load 2 (single hash in FIG. 3A), the given part 2$i$ overlapping, at least partly, a part of the load 2 irradiated by one or more preceding radiation pulses 4 of the successive radiation pulses (e.g. part 2$i$−1 in FIG. 3A—see overlapping in double hashed zone in FIG. 3A) and/or following radiation pulses 4 of the successive radiation pulses (e.g. part 2$i$+1 in the FIG. 3B—see overlapping in double hashed zone in FIG. 3B). In examples where the inspection speed V is relatively low (e.g. lower than 5 km/h such as equal to 1 km/h), successive parts of the load 4 irradiated by the successive radiation pulses 4 detected by the matrix 30 of detectors may at least overlap. For the parts of the load 2 for which there is overlapping of irradiation, an associated quantity of data detected by the matrix 30 may be increased, and the quality of the final image may also be enhanced.

Resolution in the final image increases, for a given width w of the matrix 30, as the width e of the arrays 32 decreases and the number of arrays 32 in the matrix 30 increases. In cases where the number n of arrays is equal to 2, 3, 4 or more, resolution may be enhanced as the width of the arrays decreases.

Alternatively or additionally, in some examples, the successive radiation pulses 4 may be emitted at a predetermined dose. In examples where the successive radiation pulses are emitted at a predetermined dose by the source 1 (e.g. relatively low dose 50 mGy/min), the width w of the matrix 30 of detectors may be further based on the predetermined dose of the successive radiation pulses. In some examples, the width w is such that successive parts of the load 2 irradiated by the successive radiation pulses 4 detected by the matrix 30 of detectors may at least overlap (as explained above with reference to FIGS. 3A and 3B). Overlapping of the parts of the load irradiated by the successive pulses 4 may enable a quantity of data associated with the parts for which overlapping occurs to be increased, even at a relatively low dose of the pulses, and the quality of the final image may also be enhanced.

As illustrated in FIG. 1B, a processing unit 7 may be configured to process data associated with the detection device 3 to generate the final image of the load 2, e.g. based on the inspection speed V of the load 2 and the predetermined frequency F of the successive radiation pulses 4. The processing unit 7 may be part of the system 100 or part of another apparatus, e.g. external to the system 100. The processing unit 7 may comprise a processor and a memory.

In examples where successive parts of the load 2 irradiated by the successive radiation pulses 4 detected by the matrix 30 of detectors may at least overlap, the processing unit 7 may be configured to remap the thin images associated with the detection device 3, because the parts of the load 2 for which overlapping occurs are detected several times by the detection device 3, and would thus appear several times in the final image without any remapping.

Figure 4:
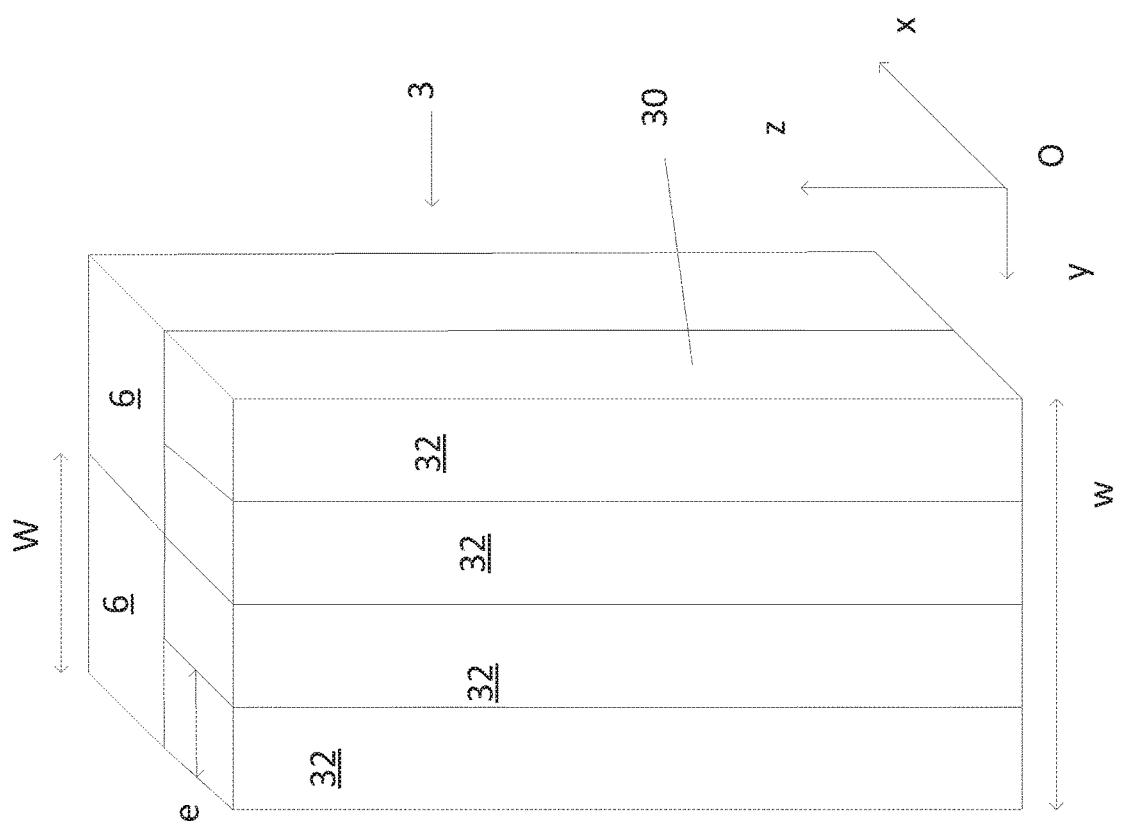
FIG. 4 shows an example detection device, in a perspective view, having additional arrays of detectors.

Alternatively or additionally, e.g. in examples where the successive radiation pulses are emitted at a relatively low dose, and as illustrated in FIG. 4, additional arrays 6 of detectors 61 may be associated with the arrays 32 of the matrix. The additional arrays 6 may be configured to detect radiation transmitted through the matrix 30. A quantity of data associated with each irradiated part of the load and detected by the matrix 30 and the additional arrays 6 may be increased compared to a configuration with the matrix 30 only, and the quality of the final image may also be enhanced. In some examples, each of the additional arrays 6 is associated with at least two arrays 32 of the matrix (the additional arrays may be associated with more than two arrays 32), and each additional array 6 has a width W associated with the width (e.g. 2xe) of at least two arrays 32 of the plurality of arrays of detectors.

In some examples, a technology of the additional arrays 6 may be similar or different compared to a technology of the arrays of the matrix 30. In some examples, the additional arrays and the arrays of the matrix may differ in a constituting material (e.g. some may have inorganic scintillators and some may have organic scintillators), or may differ in associated photodiodes and/or sizes.

Alternatively or additionally, and as illustrated in FIG. 5, some arrays 32 may have a depth p different from that of one or more other arrays 32 in the matrix 30, in a direction of the radiation pulses 4. Data associated with arrays having a different depth p may enable determining a nature of a material irradiated by the successive radiation pulses 4. In some examples, some materials of the load (e.g. non-organic materials) may have a type of data as collected by e.g. a couple comprising arrays 32 having a first depth p1 and arrays 32 having a first depth p2, whereas some other materials (e.g. organic materials) may have another type of data as collected by e.g. the couple comprising the arrays 32 having the first depth p1 and the arrays 32 having the first depth p2. Identification and/or determination of materials of the load may be enhanced. In some examples, p1 and p2 may be comprised between 1 cm and 10 cm, such as comprised between 3 cm and 5 cm (in some examples e for each detector in the array 32 may be comprised between 3 mm and 7 mm).

Figure 6:
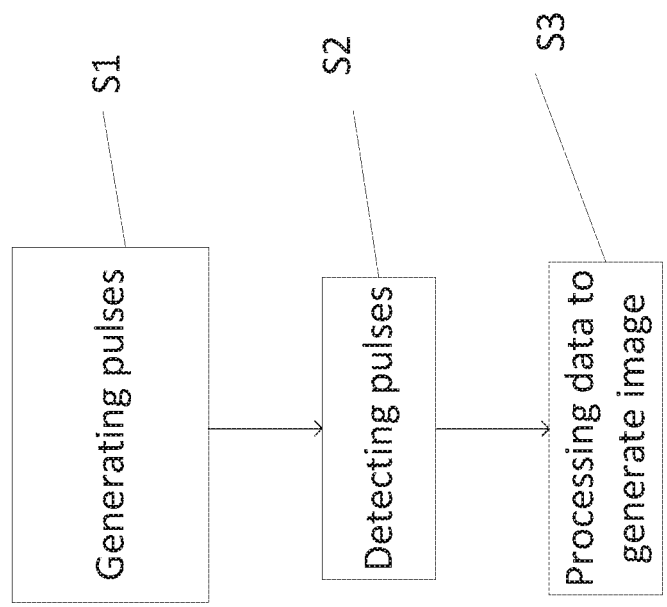
FIG. 6 shows an example flowchart which illustrate an example method for inspecting a load.

In some embodiments and as shown in FIG. 6, a method for inspecting one or more loads comprises detecting, at S2, after transmission through the load, successive radiation pulses emitted at a predetermined frequency by a source, the load being in movement in an inspection direction, at an inspection speed with respect to the system, the detection being on a detection device comprising a matrix of a plurality of arrays of detectors.

In some examples, the matrix has a width associated with the inspection direction, the width of the matrix being based on the inspection speed of the load and the predetermined frequency of the successive radiation pulses.

In some embodiments, the detecting performed at S2 may be performed by the detection device 3 of the system of any one of the aspects of the disclosure.

In some examples, the detecting may comprise transmitting the pulses through the load to inspect.

In some examples, the method illustrated in FIG. 6 may optionally comprise, at S1, generating the radiation pulses at the predetermined frequency.

In some embodiments, the generation of the pulses may be performed by the source 1 of the apparatus of any one of the aspects of the disclosure.

In some examples, the method illustrated in FIG. 6 may optionally comprise, at S3, processing data associated with the detection device to generate images of the load, based on the inspection speed of the load and the predetermined frequency of the successive radiation pulses.

In some examples, the apparatus and/or the system may comprise a processing unit configured to receive data from the detection device 3 to generate one or more images. The processing unit conventionally comprises at least a processor and a memory. In some examples, the processing unit 7 of the system and/or apparatus of any one of the aspects of the disclosure may carry out, at least partly, the processing of S3.

In another aspect of the present disclosure, there is described a computer program product comprising program instructions to program a processor to carry out a method according to any aspect of the disclosure, or to program a processor to provide system and/or apparatus of any aspect of the disclosure.

Modifications and Variations

In some examples, the apparatus may be mobile and may be transported from a location to another location (the apparatus may comprise an automotive vehicle). Alternatively or additionally, the apparatus may be static with respect to the ground and cannot be displaced.

According to some examples, some of the detectors may be mounted on a gantry, as shown in FIG. 1B. The gantry for example forms an inverted "L" extending in the median plane XOZ. In mobile inspection systems and/or apparatuses, the gantry may comprise an electro-hydraulic boom which can operate in a retracted position in a transport mode (not shown on the Figures) and in an inspection position (FIG. 1B). The boom may be operated by hydraulic actuators (such as hydraulic cylinders). In static inspection systems, the gantry may comprise a static structure.

In some embodiments, the throughput of a scan mode, i.e. the number of loads 4 inspected by unit of time, may be of 20 to 30 loads/hour. Alternatively or additionally, the throughput of a pass-through mode may be higher than the throughput in the scan mode, and may be for example of from 50 to 200 loads/hour.

The collimator 11 may be configured to generate the pulses forming a fan beam, but other forms for the pulses are envisaged.

The source may comprise an accelerator, i.e. may be configured to produce and accelerate an electron beam on a metal target (such as tungsten and copper) to generate the photons of the pulses (by the so-called braking radiation effect, also called "Bremsstrahlung"). The source may be configured to be activated by a power supply, such as a battery of an apparatus comprising a vehicle and/or an external power supply.

The pulses may comprise X-ray radiation and/or ionizing electromagnetic radiation. The pulses may comprise γ-ray radiation and/or neutron radiation. Non-limiting examples of irradiation energy from the source 1 may be comprised between 50 keV and 15 MeV, such as 2 MeV to 6 MeV, for example. Other energies are envisaged. In some examples the energy of the X-ray radiation may be comprised between 100 keV and 15 MeV, and the dose may be comprised between 2 mGy/min and 30 Gy/min (Gray). In some examples, the power of the generated radiation may be e.g., between 100 keV and 9.0 MeV, typically e.g. 2 MeV, 3,5 MeV, 4 MeV, or 6 MeV, for a steel penetration capacity e.g., between 40 mm to 400 mm, typically e.g., 300 mm (12in). In some examples, the dose may be e.g., between 20 mGy/min and 120 mGy/min. In some examples, the power of the X-ray source may be e.g., between 4 MeV and 10 MeV, typically e.g., 9 MeV, for a steel penetration capacity e.g., between 300 mm to 450 mm, typically e.g., 410 mm (16.1 in). In some examples, the dose may be 17 Gy/min.

It should be understood that the inspection radiation source may comprise sources of other radiation.

The inspection radiation source may also comprise sources which are not adapted to be activated by a power supply, such as radioactive sources, such as using $Co_{80}$ or $Cs_{137}$. In some examples, the inspection system may comprise other types of detectors, such as optional gamma and/or neutrons detectors e.g., adapted to detect the presence of radioactive gamma and/or neutrons emitting materials within the load, e.g., simultaneously to the X-ray inspection.

In some examples, one or more memory elements (e.g., the memory element of the processing unit or a memory element of the processor) can store data used for the operations described herein. This includes the memory element being able to store software, logic, code, or processor instructions that are executed to carry out the activities described in the disclosure.

A processor can execute any type of instructions associated with the data to achieve the operations detailed herein in the disclosure. In one example, the processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g,, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

As one possibility, there is provided a computer program, computer program product, or computer readable medium, comprising computer program instructions to cause a programmable computer to carry out any one or more of the methods described herein. In example implementations, at least some portions of the activities related to the processing unit and/or the detector may be implemented in software. It is appreciated that software components of the present disclosure may, if desired, be implemented in ROM (read only memory) form. The software components may, generally, be implemented in hardware, if desired, using conventional techniques.

Other variations and modifications of the system will be apparent to the skilled in the art in the context of the present disclosure, and various features described above may have advantages with or without other features described above. The above embodiments are to be understood as illustrative examples, and further embodiments are envisaged. It is to be understood that any feature described in relation to any one embodiment may be used alone, or in combination with other features described, and may also be used in combination with one or more features of any other of the embodiments, or any combination of any other of the embodiments, Furthermore, equivalents and modifications not described above may also be employed without departing from the scope of the invention, which is defined in the accompanying claims.

The invention claimed is:

1. A system for inspection of a load, comprising:
   a detection device configured to detect, after transmission through the load, successive radiation pulses emitted at a predetermined frequency by a source, the load being in movement in an inspection direction, at an inspection speed with respect to the system, the radiation pulses comprising at least one of x-ray radiation, gamma radiation, or neutron radiation,
   the detection device comprising a matrix of a plurality of arrays of detectors, the matrix of detectors defining a matrix width, the matrix width such that the detection device is configured to detect a current radiation pulse irradiating at least a current part of the load, the current radiation pulse overlapping, at least partly, a part of the load irradiated by at least one type of radiation pulses taken from the list comprising: preceding radiation pulses of the successive radiation pulses or following radiation pulses of the successive radiation pulses, and
   a processing unit configured to process data associated with the detection device to generate images of the load, based on the inspection speed of the load and the predetermined frequency of the successive radiation pulses, the processing unit configured to remap the images of the load when overlapping of at least one set of successive radiation pulses occurs and thereby account for any repeat imaging of a given part of the load,
   wherein the matrix has a width associated with the inspection direction, the width of the matrix being based on the inspection speed of the load and the predetermined frequency of the successive radiation pulses.

2. The system of claim 1, wherein the width of the matrix is further based on a predetermined threshold associated with a dimension of the load.

3. The system of claim 1, wherein each array of the plurality of arrays has a width associated with the inspection direction of the load, the width of the matrix being further based on the width of the arrays of the matrix and the number of arrays in the plurality of arrays.

4. The system of claim 3, wherein the width of each array is such that:

$$0.2\ mm \leq w \leq 50\ mm.$$

5. The system of claim 1, wherein the successive radiation pulses are emitted at a predetermined dose by the source, the number of arrays of detectors in the matrix being further based on the predetermined dose of the successive radiation pulses.

6. The system of claim 1, wherein the detection device further comprises one or more additional arrays of detectors, each additional array of detectors being:
   configured to detect radiation transmitted through the matrix, and
   associated with at least two arrays of the matrix.

7. The system of claim 1, wherein each array has a depth associated with the transmission direction of the radiation pulses, wherein the matrix comprises one or more arrays having a depth different from that of one or more other arrays in the matrix.

8. The system of claim 1, wherein one or more arrays comprise a linear array of detectors.

9. The system of claim 8, wherein the linear arrays extend in a direction perpendicular to the inspection direction.

10. The system of claim 1, wherein the matrix is configured to be located within an angular width of each radiation pulse.

11. The system of claim 1, wherein the width w of the matrix is such that:

$$0.5\ mm \leq w \leq 150\ mm.$$

12. The system of claim 1, wherein a number n of arrays in the matrix is such that:

$$2 \leq n \leq 25.$$

13. An apparatus comprising:
   at least one system for inspection of a load, comprising:
      a detection device configured to detect, after transmission through the load, successive radiation pulses emitted at a predetermined frequency by a source, the load being in movement in an inspection direction, at an inspection speed with respect to the system, the radiation pulses comprising at least one of x-ray radiation, gamma radiation, or neutron radiation,
      the detection device comprising a matrix of a plurality of arrays of detectors, the matrix of detectors defining a matrix width, the matrix width such that the detection device is configured to detect a current radiation pulse irradiating at least a current part of the load, the current radiation pulse overlapping, at least partly, a part of the load irradiated by at least one type of radiation pulses taken from the list comprising: preceding radiation pulses of the successive radiation pulses or following radiation pulses of the successive radiation pulses, and
      a processing unit configured to process data associated with the detection device to generate images of the load, based on the inspection speed of the load and the predetermined frequency of the successive radiation pulses, the processing unit configured to remap the images when overlapping of at least one set of successive radiation pulses occurs and thereby account for any repeat imaging of a given part of the load,
      wherein the matrix has a width associated with the inspection direction, the width of the matrix being based on the inspection speed of the load and the predetermined frequency of the successive radiation pulses; and
   a source configured to emit the successive radiation pulses at the predetermined frequency.

14. The apparatus of claim 13, wherein the source is configured to emit the successive pulses at a predetermined frequency comprised between 50 Hz and 1000 Hz.

15. The apparatus according to of claim 13, further comprising a sensor for measuring the speed of the load.

16. A method of inspection of a load, comprising:
   detecting, after transmission through the load, successive radiation pulses emitted at a predetermined frequency by a source, the load being in movement in an inspection direction, at an inspection speed with respect to the system, the detection being on a detection device comprising a matrix of a plurality of arrays of detectors, the radiation pulses comprising at least one of x-ray radiation, gamma radiation, or neutron radiation, the matrix of detectors defining a matrix width, the matrix width such that the detection device is configured to detect a current radiation pulse irradiating at least a current part of the load, the current radiation pulse overlapping, at least partly, a part of the load irradiated by at least one type of radiation pulses taken from the list comprising: preceding radiation pulses of the successive radiation pulses or following radiation pulses of the successive radiation pulses, and processing data associated with the detection device to generate images of the load using a processing unit, based on the inspection speed of the load and the predetermined frequency of the successive radiation pulses, the processing unit configured to remap the images of the load when overlapping of at least one set of successive radiation pulses occurs and thereby account for any repeat imaging of a given part of the load, wherein the matrix has a width associated with the inspection direction, the width of the matrix being based on the inspection speed of the load and the predetermined frequency of the successive radiation pulses.

\* \* \* \* \*